US006507591B1

(12) United States Patent
Bray

(10) Patent No.: US 6,507,591 B1
(45) Date of Patent: Jan. 14, 2003

(54) HANDSHAKING BETWEEN REPEATER AND PHYSICAL LAYER DEVICE IN A VARIABLE RATE NETWORK TRANSCEIVER

(75) Inventor: Michael Richard Bray, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/289,953

(22) Filed: Apr. 13, 1999

Related U.S. Application Data

(60) Provisional application No. 60/082,183, filed on Apr. 17, 1998.

(51) Int. Cl.[7] .................................................. H04J 15/00

(52) U.S. Cl. ........................................ 370/501; 370/465

(58) Field of Search ................................ 370/463, 464, 370/465, 466, 468, 501, 538; 455/517

(56) References Cited

U.S. PATENT DOCUMENTS

| | | | |
|---|---|---|---|
| 5,450,611 A | * 9/1995 | Bonvallet et al. | 455/517 |
| 5,477,539 A | * 12/1995 | Brown | 370/538 |
| 5,754,552 A | * 5/1998 | Allmond et al. | 370/465 |
| 6,389,029 B1 | * 5/2002 | McAlear | 370/465 |

OTHER PUBLICATIONS

IEEE Standard 802.3u–1995, §27: "Repeater for 100 Mb/s Baseband Networks".*

IEEE Standard 802.3u–1995, §22: "Reconciliation Sublayer (RS) and Media Independent Interface".*

* cited by examiner

*Primary Examiner*—Salvatore Cangialosi

(57) ABSTRACT

A novel method of operating physical layer devices in a local area network, such as one conforming to Ethernet protocol, in which there are a plurality of repeaters of respectively different data rates for communicating with a link partner on a network medium via the physical layer devices. Each physical layer device is prevented from communicating with the repeaters, when a change in the operating speed of the physical layer device is detected. Then, status information of the physical layer device is determined, and the physical layer device is enabled to communicate with a selected one of the repeaters having a data rate conforming to the operating rate of the physical layer device. In a preferred embodiment, each physical layer device has a variable operating speed selected depending on the operating speed of the link partner. A plurality of busses corresponding, respectively, to the speeds of operation of the repeaters, are provided for interconnecting the repeaters and the physical layer devices. A multiplexer interconnects each of the physical layer devices to a selected one of the plurality of busses. In response to a change in the operating speed of the physical layer device, handshake logic automatically prevents the physical layer device from communicating with the repeaters until one of the repeaters is ready to communicate with the physical layer device. The handshake logic enables the repeaters to read status information of the physical layer device and change its connection to the repeaters, based on the status information.

9 Claims, 4 Drawing Sheets

HANDSHAKING BETWEEN REPEATER AND PHYSICAL LAYER DEVICE IN A VARIABLE RATE NETWORK TRANSCEIVER

This application claims priority of provisional patent application Ser. No. 60/082,183 filed on Apr. 17, 1998, and entitled "Quad Fast Ethernet Transceiver for 10 BASE-T/ 100 BASE-X (QFEX 10/100)," the entire disclosure of which is incorporated by reference herein.

TECHNICAL FIELD

The present invention relates to network interfacing and, more particularly, to a novel network transceiver that performs handshaking to establish synchronization between a repeater and a physical layer device at different data rates.

BACKGROUND ART

A Local Area Network, or (LAN), is a communications systems that provides a connection among a number of independent computing stations within a small area, such as a single building or group of adjacent buildings. One type of network structure uses one or more repeaters in a star typology, with each repeater having several ports. A data packet received at one port is retransmitted to all other ports of the repeater. Each repeater in turn restores timing and amplitude degradation of data packets received at one port and retransmits the packets to all other ports.

Traditional Ethernet networks (10BASE-T) operate at 10 Mb/s Ethernet protocol, as described by IEEE Standard 802.3; the majority of Ethernet interfaces currently operate at this data rate. However, a newer Ethernet network, under IEEE standard 802.3 u, accomplishes the faster operation of 100 BASE-T systems, at 125 Mb/s using unshielded twisted pair (UTP) physical media. The 100 BASE-T standard defines operation over two pairs of category 5 UTP (100 BASE-TX) or category 3 UTP, 100 BASE-FX, covered by the 100 BASE-T standard, allows operation over dual fiber optic cabling.

Ethernet protocol provides for a Media Access Control (MAC), enabling network interface devices at each network node to share accesses to the network medium. A Media Independent Interface, or MII, connects the MAC to a physical layer (PHY) transceiver configured for a particular network medium, e.g., 10 BASE-T, 100 BASE-FX, or 100 BASE-TX. The physical layer transceiver is configured for converting the MII protocol signals output by the MAC into analog network signals, such as Multiple Layer Transition-3 (MLT-3) signals for 100 Mb/s Ethernet networks, or Manchester-encoded signals for 10 Mb/s Ethernet networks. (Networks often use several PHY devices operating over different media types.)

Ethernet switches have multiple interfaces, each capable of either 10 Mb/s or 125 Mb/s operation, or potentially another data rate operation, and are able to be connected in communication with a link partner operating at a corresponding data rate. Because a switch allows multiple simultaneous traffic on its ports, it is possible to allow the ports to operate at different speeds relative to each other. A repeater, on the other hand, is configured to operate at only a single data rate. A 10 Mb/s repeater, for example, cannot be placed in communication with a link partner operating at 100 Mb/s.

Thus, in order to communicate with link partners operating at different data rates, several repeaters having corresponding data rates should be used. Alternatively, several repeaters may be integrated into a single repeater device having repeater cores running at different speeds. For example, for link partners operating at 100 Mb/s and 10 Mb/s, each PHY device should be switched between a 100 Mb/s repeater and a 10 Mb/s repeater.

When a PHY device changes its speed, synchronization should be established between the PHY device and a repeater to make sure that the PHY device is mapped to the repeater capable of communicating at required speed. Therefore, it would be desirable to provide a repeater/PHY device handshake mechanism that insures that a PHY device is mapped to a proper repeater.

DISCLOSURE OF INVENTION

The invention provides a novel method of operating physical layer devices in a local area network, such as one conforming to Ethernet protocol, in which there are a plurality of repeaters of respectively different data rates for communicating with link partners on a network medium via the physical layer devices. Each physical layer device is automatically prevented from communicating with the repeaters, when a change in the data rate of the physical layer device is detected. Then, status information of the physical layer device is determined, and the physical layer device is enabled to communicate with a selected one of the repeaters having a data rate conforming to the data rate of the physical layer device.

In accordance with one aspect of the invention, a network transceiver comprises one or more physical layer devices having a variable data rate selected depending on the operating speeds of said link partners, and a plurality of busses corresponding, respectively, to the data rates of the repeaters, for interconnecting the repeaters and one or more of the physical layer devices. A multiplexer interconnects each of the physical layer devices to a selected one of the plurality of busses. Handshake logic is responsive to a change in the data rate of a physical layer device for preventing it from communicating with the repeaters until one of the repeaters is ready to communicate with the physical layer device. The handshake logic enables the repeaters to read status information of the physical layer device and change its connection to the repeaters, based on the status information.

In the preferred embodiment, the physical layer devices are configured to perform signal conversion for signal compatibility between the repeaters and the link partners. The physical layer devices each include first transmit and receive channels of a first data rate and second transmit and receive channels of a second data rate. An auto-negotiation unit controls the multiplexer to interconnect each of the physical layer devices to a corresponding bus selected depending on the operating speed of the link partner.

Various objects and features of the present invention will become more readily apparent to those skilled in the art from the following description of specific embodiments thereof, especially when taken in conjunction with the accompanying drawings.

BEST MODE FOR PRACTICING THE INVENTION

Figure 1:
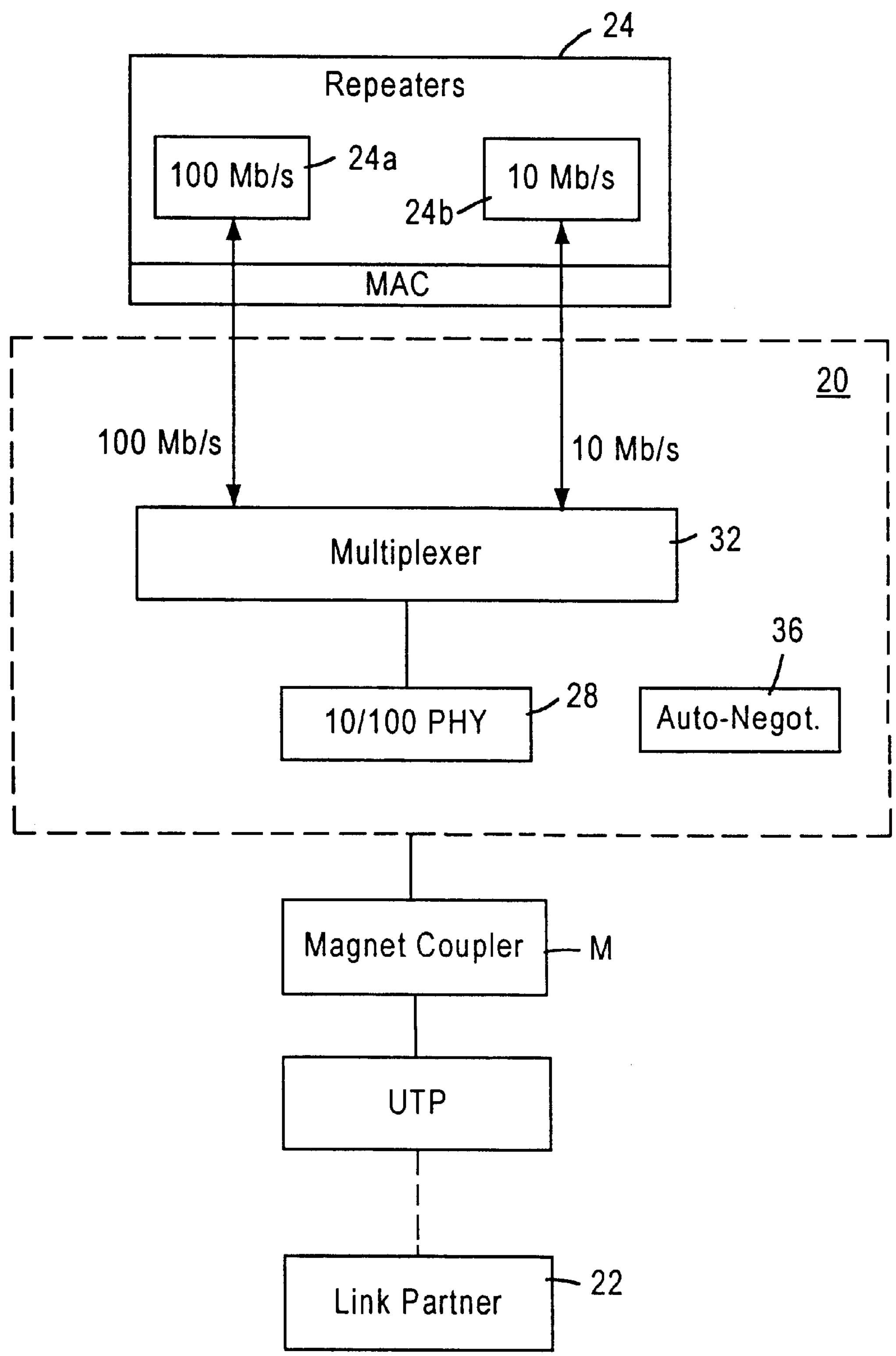
FIG. 1 is a diagram of a system, in which the invention may be implemented.

FIG. 1 shows a transceiver 20, in accord with the invention, for establishing a communication path between a link partner 22 on a network medium and repeaters 24 that are data rate compatible with the operating speed of the link partner. For example, a 100 Mb/s repeater 24*a* and a 10 Mb/s repeater 24*b* may be employed. The repeaters may be members of a system of repeaters provided in an application-specific integrated circuit (ASIC) at a HUB within which the repeaters will distribute a data stream received from the network to the various nodes. The repeaters are coupled to the transceiver via a MII interface.

The transceiver comprises a physical layer (PHY) device 28 having a data rate corresponding to the speed of operation of link partner 22 on the network medium. A multiplexer 32 is controlled by an auto-negotiation unit 36 to route the output of the PHY device 28, through the media independent interface (MII), to whichever one of the repeaters 24*a*, 24*b* that is data rate compatible with the link partner 22. The operating speed of link partner 22 on the network medium is determined by the auto-negotiation unit 36 that establishes the speed at which to operate PHY device 28 according to IEEE 802.3 protocol.

In the described embodiment, the PHY device 28 is configured either for 10 Mb/s data processing using Manchester encoding, or for 100 Mb/s data processing. Auto-negotiation unit 36 selects the output path of multiplexer 32 and also determines which processing speed, 100 Mb/s or 10 Mb/s, the PHY device implements. A magnetic coupler M, between the PHY device 28 and the UTP, performs network signal amplification in a conventional manner.

Figure 2:
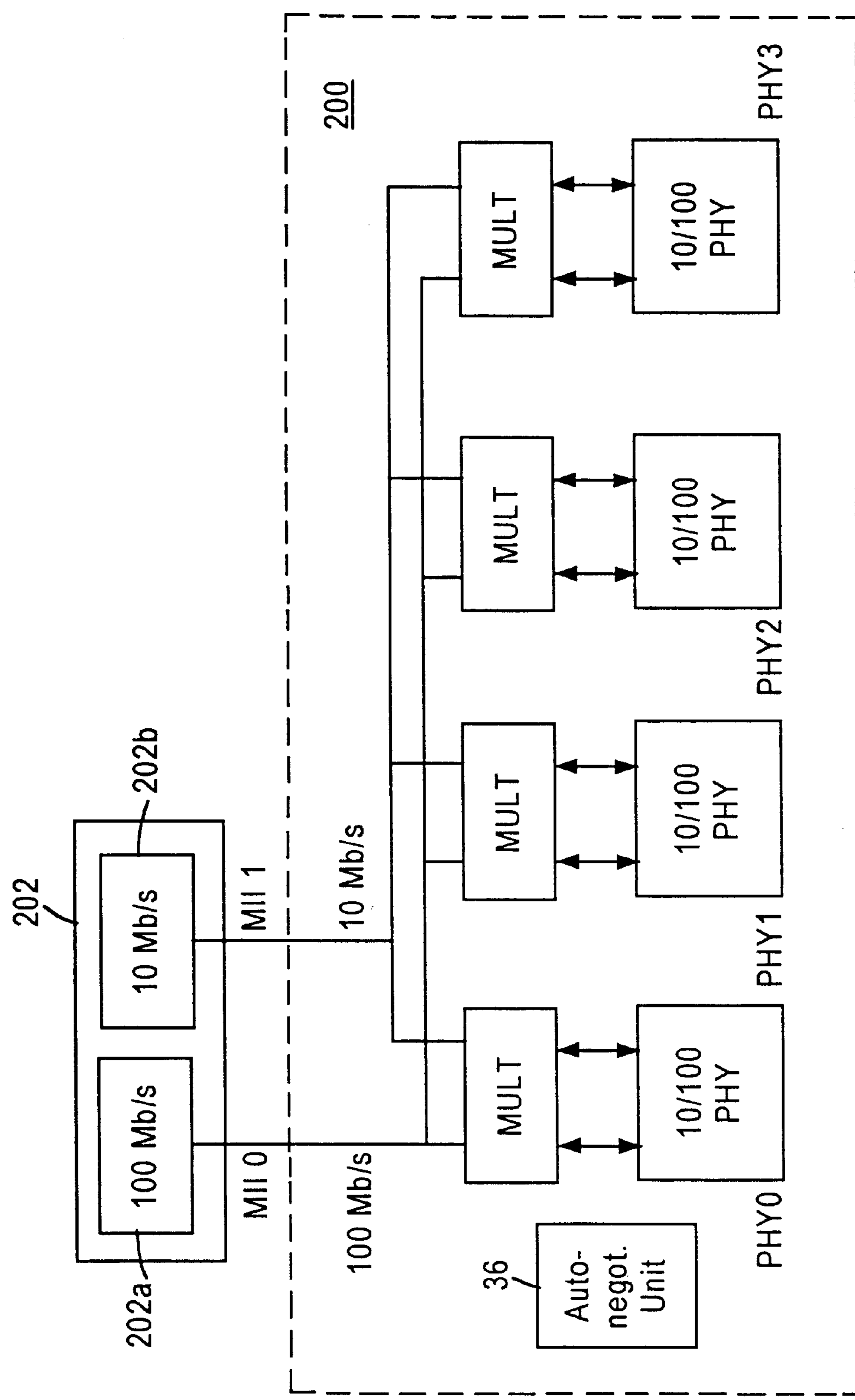
FIG. 2 is a diagram showing an embodiment implementing multiple PHY devices and a shared media independent interface.

FIG. 2 shows an example, in which a transceiver 200 coupled to a 10/100 repeater ASIC 202 have multiple PHY devices 10/100 PHY connected in parallel, through corresponding multiplexers, to MII ports MII0 and MII1 operating at 100 Mb/s and 10 Mb/s, respectively. The repeater ASIC 202 has a 100 Mb/s repeater core 202*a* connected to the port MII0, and a 10 Mb/s repeater core 202*b* coupled to the port MII1. Each MII port connects to an MII bus. Only data signals are bused; other signals, such as carrier signals and enable signals, are separately supplied to the MAC layers of the repeaters. Thus, multiple PHY ports can share one MII port.

In this example, there are four PHY ports, PHY0 to PHY3, one corresponding to each of the four PRY devices shown. The number of PHY ports and MII ports is arbitrary, with four PHY ports and two MII ports being depicted in this example. Auto-negotiation unit 36 performs an auto-negotiation protocol defined in the IEEE Std. 802.3u 100Base-T supplement Clause 28 to select the best transmission rate and transmission mode based on user requirements and capabilities of a link partner. The auto-negotiation unit 36 is responsive to the operating characteristic of the link partner to configure the corresponding multiplexer to establish a bidirectional data path between a link partner and a repeater having an operating speed that conforms to that of the link partner. The auto-negotiation unit of each PHY port determines the speed of operation of the link partner, and controls the corresponding multiplexer to steer the data stream to the appropriate bus and repeater.

Assume for this example, that port PHY0 detects a link partner having an adapter card capable of operating either at 10 Mb/s or 100 Mb/s. The autonegotiation unit configures the PRY device of the port 0 for 100 Mb/s and controls its multiplexer to direct the output of the PHY device to the 100 Mb/s bus. Assume further that port PHY2 detects another 10/100 Mb/s adapter card, and configures that PHY and multiplexer similarly. Both ports PHY0 and PHY2 are now coupled to the 100 Mb/s bus and are configured for 100 Mb/s operation.

Assume next that ports PHY1 and PHY3 have established a connection with a 10 Mb/s link partner. The auto-negotiation units of these ports configure the corresponding PHY devices for 10 Mb/s and control their multiplexers to steer the outputs of the PHY devices to the 10 Mb/s bus.

Thus, in a shared MII mode, one MII bus is provided for the 10 Mb/s data path and one for the 100 Mb/s data path. Internal multiplexers connect each PHY port to either the 10 Mb/s or 100 Mb/s MII bus. As a result, each PHY port is mapped to the MII port that supports the required data rate. For example, if port PHY2 is mapped to port MII0 connected to the 100 Mb/s repeater core, the transmit data TxD going from the 100 Mb/s repeater core via the port MII0 will be transmitted out of the PHY2 to a link partner, and the receive data RxD received from the link partner via the PHY2 will come out of the port MII0 to the 100 Mb/s repeater core.

However, a repeater cannot communicate with a PHY device run at a data rate different from the repeater's data rate. For example, a 100 Mb/s repeater cannot be placed in communication with a link partner operating at 10 Mb/s. In accordance with the present invention, a PHY device/repeater handshake mechanism is provided to ensure that each PHY port is mapped to a repeater operating at a required data rate.

Figure 3:
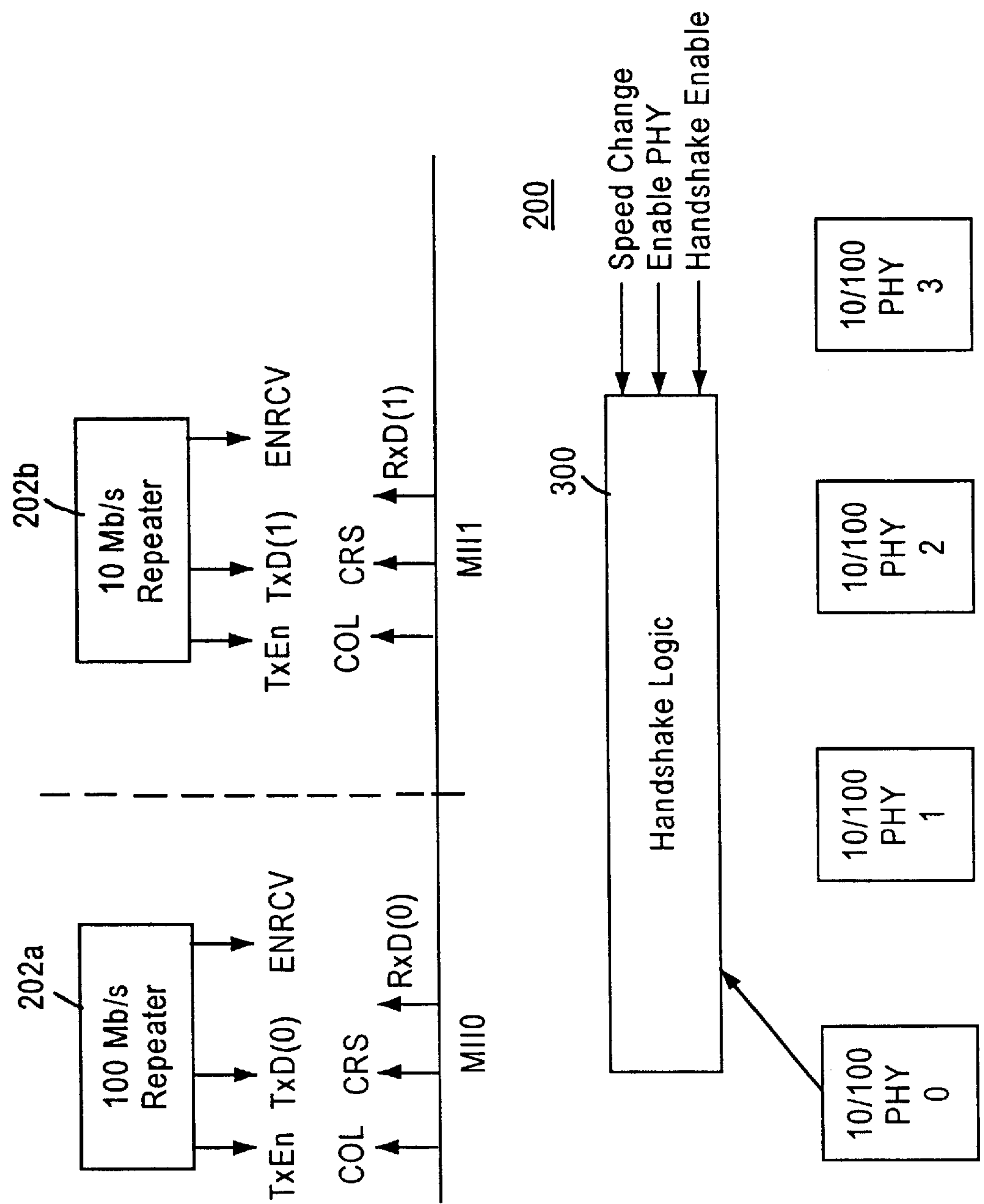
FIG. 3 is a diagram illustrating a handshake mechanism of the present invention.

Referring to FIG. 3, the network transceiver of the present invention comprises handshake logic 300 for performing handshaking between repeaters and PHY devices. As discussed in more detail later, the handshake logic 300 is responsive to a change in speed of a PHY port to determine that the repeater having the appropriate speed is ready to communicate with that PHY port.

When the auto-negotiation unit 36 causes a PHY port to change its speed, an interrupt pin of the transceiver is activated. A speed change interrupt signal produced by the interrupt pin initiates operations of the handshake logic 300. The handshake logic 300 reads an enable PHY bit and a handshake enable bit from a configuration MII register used in a shared MII mode to control handshaking between repeaters and PHY devices and to program mapping of PHY ports to MII ports. The configuration MII register is provided for each PHY port of the transceiver. The handshake enable bit may be set to 1 to enable the handshaking. The enable PHY bit is set to 1 to enable PHY if the handshake enable bit is set. The enable PHY bit is automatically reset when a speed change interrupt signal is generated.

In a shared MII mode, some of the signals transferred between repeaters and PHY devices are shared by multiple PHY ports, whereas the other signals are dedicated to each of the PHY ports. Among shared signals are transmit data TxD[3:0], receive data RxD[3:0], and receive clock Rx_CLK. Dedicated signals include transmit enable signal TX_EN, carrier sense signal CRS, collision signal COL, and enable receive signal ENRCV[3:0].

The TX_EN signal asserted by a repeater is used to enable transmission of data on each PHY port. The CRS signal is asserted by a PHY port to indicate receive activity on the port. The COL signal is asserted by a PHY port when a collision is detected on the transmit and receive path of the corresponding PHY device. The four-bit ENRCV[3:0] signal for PHY ports 3 to 0, respectively, is asserted by a repeater to enable the reception of receive signals. When any bit of the ENRCV signal is high, receive signals of the corresponding PHY port is presented at the MII port, to which that PHY port is mapped. For example, the 100 Mb/s repeater core 202*a* is mapped to the port MII0, and the 10 Mb/s repeater core 202*b* is mapped to the port MII1. Thus, by default, all PHY ports operating at 100 Mb/s will be mapped to the port MII0, and all 10 Mb/s PHY ports will be mapped to the port MII1. Each of the repeaters supplies the PHY port, which is mapped to the corresponding MII port, with the TX_EN and ENRCV signals. Each of the PHY ports provides the corresponding repeater with the COL and CRS signals.

Figure 4:
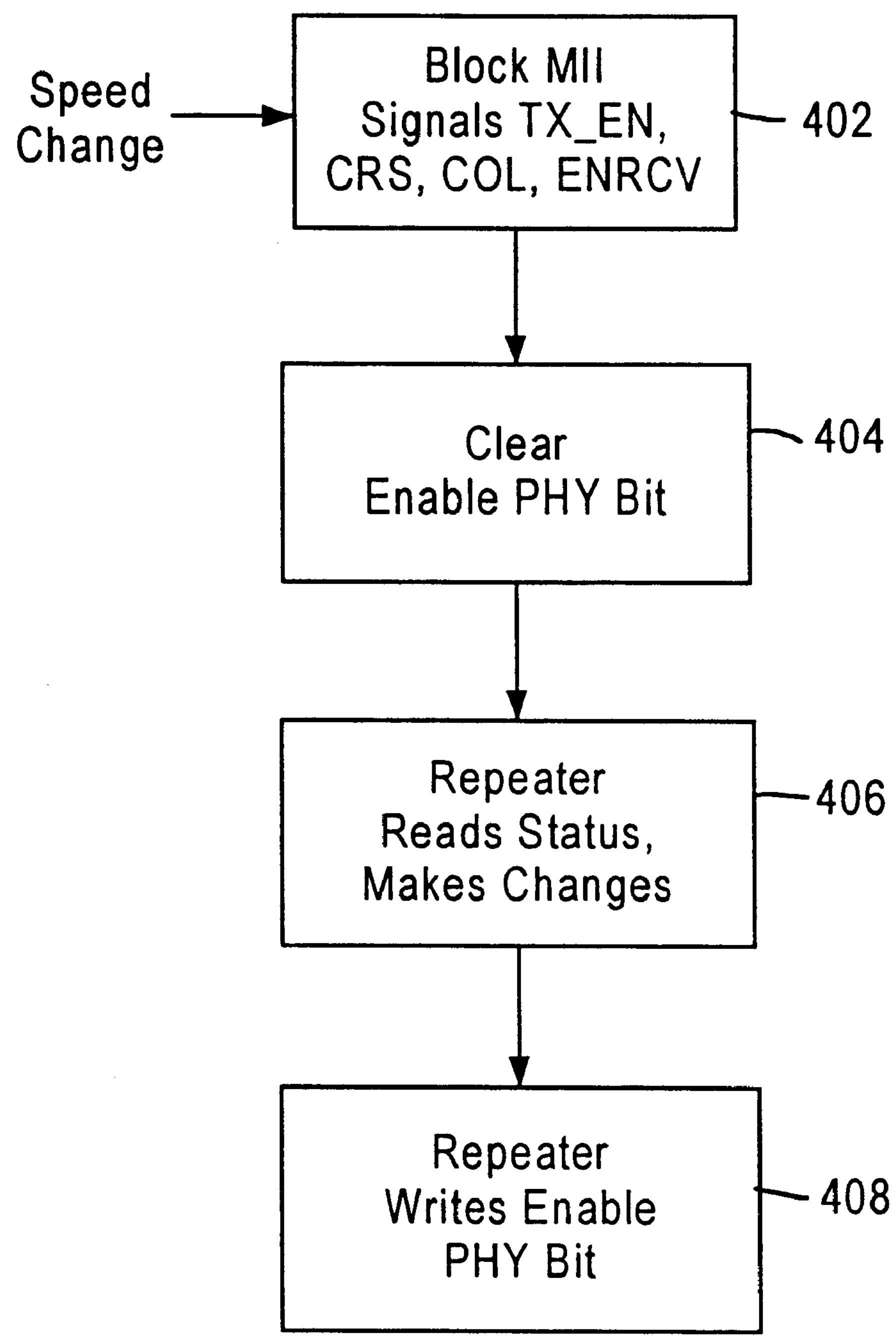
FIG. 4 is a flow chart illustrating operation of the handshake mechanism.

Referring to flow-chart in FIG. 4, the handshake logic 300 operates as follows. When the auto-negotiation unit 36 determines that a PHY port has changed its speed, an interrupt pin of the transceiver is activated to produce the speed change interrupt signal. In response, the enable PHY bit in the PHY port's configuration register is automatically reset. If the handshake enable bit in the configuration register is set to 1 to enable handshaking, the handshake logic 300 prevents this PHY port from receiving the TX_EN and ENRCV signals from the MII port, and from transmitting COL and CRS signals to the MII port (block 402). Thus, the PHY port will be prevented from driving the repeater 202, or receiving signals from the repeater 202.

After disabling the PHY port, the handshake procedure goes to block 404 to clear an enable PHY bit. During, this operation, the PHY port is remapped to a new MII port that supports its new operating speed. For example, when a PHY port mapped to port MII1 changes its speed from 10 Mb/s to 100 Mb/s, it is switched to port MII0.

Then, the repeater 202 reads status information of the PHY port to make sure that the newly established connection is correct (block 406). For example, the status information may include the speed status, link status, duplex mode status, and auto-negotiation status of the PHY port. The status information may be stored in status and interrupt registers provided for each PHY port. If the status information indicates that the newly established connection needs to be changed, the repeater 202 reconfigures the PHY port to connect it to another MII port. For example, the configuration register may contain MII select bits, which may be set by the repeater 202 to connect the PHY port to a required MII port.

Once the repeater 202 makes sure that the established connection is correct or changes the connection in accordance with the status information, it sets the enable PHY bit in the configuration register to enable the PHY port to transmit and receive signals to or from the repeater (block 408).

Thus, the handshaking procedure of the present invention allows a network transceiver to synchronize a repeater and a PHY device at variable data rates.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative way, rather than in a restrictive sense. For example, the invention is applicable in standards other than IEEE 802.3. As another variation, although the described embodiment provides repeaters that are external to the PHY device, the repeaters could, alternatively, be configured within the PHY functionality.

What is claimed is:

1. A network transceiver for interconnecting a plurality of repeaters, operable, respectively, a different operating speeds, and a transmission medium on which are provided link partners operable at different operating speeds corresponding to the operating speeds of said repeaters, the network transceiver comprising:

one or more physical layer devices having a variable operating speed selected depending on the operating speeds of said link partners;

a plurality of buses corresponding, respectively, to said speeds of operaton of said repeaters, for interconnecting said plurality of repeaters and said one or more physical layer devices;

a multiplexer for interconnecting each said one or more physical layer devices toa selected one of said plurality of busses; and a handshake logic responsive to a change in the operating speed of said one or more physical layer devices for preventing said one or more physical layer devices from communicating with said plurality of repeaters until one of the repeaters is ready to communicate with said one or more physical layer devices, wherein said handshake logic prevents said one or more physical layer devices from receiving a transmission enabling signal from said plurality of repeaters in response to a change in the operating speed of said one or more physical layer devices;

said handshake logic prevents said one or more physical layer devices from receiving a receiption enabling signal from said plurality of repeaters in response to a change in the operating speed of said one or more physical layer devices;

said handshake logic prevents said one or more physical layer devices from transmitting a reception activity signal to said plurality of repeaters in response to a change in the operating speed of said one or more physical layer devices; and said handshake logic prevents said one or more physical layer devices from transmitting a collision indicating signal to said plurality of repeaters in response to a change in the operating speed of said one or more physical layer devices.

2. The transceiver of claim 1, wherein said plurality of busses are media independent interfaces conforming to IEEE Std. 802.3.

3. The transceiver of claim 1, wherein said handshake logic enables said plurality of repeaters to read status information of said one or more physical layer devices when said one or more physical layer devices is disabled in response to a change in the operating speed of said one or more physical layer devices.

4. The transceiver of claim 3, wherein said handshake logic enables said plurality of repeaters to connect said one or more physical layer devices to a selected one of the repeaters having an operating speed conforming to the operating speed of said one or more physical layer devices, based on said status information.

5. The transceiver of claim 1, wherein said handshake logic is controlled by said plurality of repeaters to enable said one or more physical layer devices to communicate with a selected one of the repeaters having an operating speed conforming to the operating speed of said one or more physical layer devices.

6. The transceiver of claim 1, wherein said one or more physical layer devices are configured to perform signal conversion for signal compatibility between said repeaters and said link partners.

7. The transceiver of claim 1, wherein said one or more physical layer devices each include first transmit and receive channels of a first data rate and second transmit and receive channels of a second data rate.

8. The transceiver of claim 1, further comprising an auto-negotiation unit for controlling said multiplexer to interconnect each said one or more physical layer devices to a corresponding bus selected depending on the operating speed of said link partners.

9. The transceiver of claim 1, wherein said plurality of repeaters are integrated within an application specific integrated circuit (ASIC).

* * * * *